Dec. 6, 1966  H. DERSCHMIDT  3,289,770

HELICOPTER ROTOR SYSTEM

Filed Aug. 3, 1964  5 Sheets-Sheet 1

Inventor:
Hans Derschmidt
By McGlew and Toren
Attorneys

Dec. 6, 1966  H. DERSCHMIDT  3,289,770
HELICOPTER ROTOR SYSTEM
Filed Aug. 3, 1964  5 Sheets-Sheet 3

Inventor:
Hans Derschmidt
By Mulsen and Tomen
Attorneys

Inventor:
Hans Derschmidt
By [signature]
Attorneys

Dec. 6, 1966 H. DERSCHMIDT 3,289,770
HELICOPTER ROTOR SYSTEM
Filed Aug. 3, 1964 5 Sheets-Sheet 5
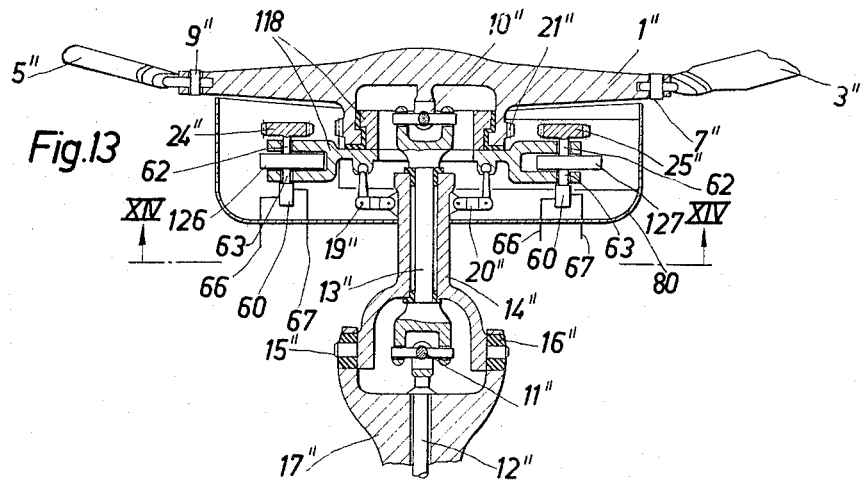
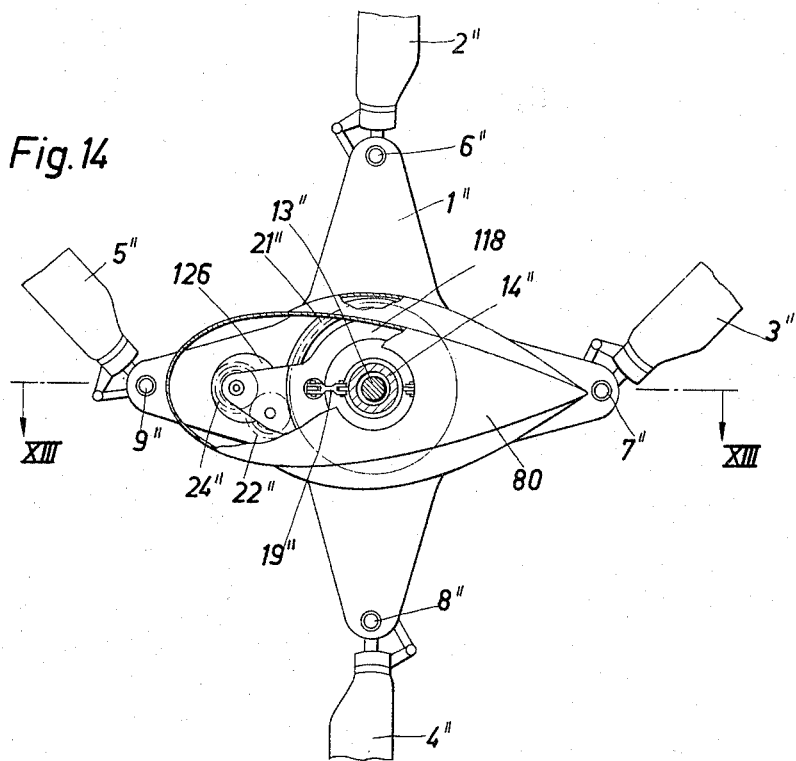
Inventor:
Hans Derschmidt
By McGlew and Toren
Attorneys

3,289,770
HELICOPTER ROTOR SYSTEM
Hans Derschmidt, Munich, Germany, assignor to Bolkow Gesellschaft mit beschrankter Haftung, Hamburg, Germany
Filed Aug. 3, 1964, Ser. No. 387,037
Claims priority, application Germany, Aug. 14, 1963, B 73,113
19 Claims. (Cl. 170—160.25)

This invention relates in general to helicopters and helicopter rotor construction, and particularly to a new and useful helicopter rotor having rotor blades pivotally mounted for pivotal lead-lag movement in addition to the rotative movement imparted by the rotor with improved means for effecting such movement.

The present invention provides a helicopter with a device for producing different blade speeds during the rotation of the helicopter rotor. With blades mounted for lead-lag movement in addition to rotative movement, it is desirable to impart a lower speed to the forward rotor blades and a higher speed to the trailing rotor blades in respect to the direction of flight of the helicopter when the rotor is rotated. As far as helicopters of this type are known, they employ rigid motion transmitting means, for example, push rods or hydraulic working pistons, which are connected to the rotor blades to impart a controlled pivotal lead-lag movement in accordance with the rotation of the rotor in order to change the blade speeds. The transmission means connect each rotor blade rigidly to a central drive which controls the periodic pivotal movement of the blades. Such known control devices have the disadvantage, however, that their construction is complicated and their overall weight is relatively high because each individual blade must be equipped with corresponding transmission means.

In order to keep the vibrations of the centers of gravity of all rotor blades from resulting vibrations in the rotor plane over a wide range of controlled pivotal movement as small as possible, the known helicopters must have in addition a greater number of rotor blades than will be necessary with the present invention.

In accordance with the invention, the rotor blades are moved pivotally by forces which are set up by rotating weight elements or imbalance producing masses which are pivotally mounted on the rotor and which are driven by means to shift the positioning of the masses to effect pivotal lead-lag movement of the blades of the rotor upon rotation of the rotor. The masses are advantageously rotated by a transmission means connected to the rotor which insures a mass rotational speed which is higher by a multiple corresponding to the number of blades of the rotor than the rotor speed in the direction of rotation of the rotor. The imbalance producing means and the simple transmission required for rotating them provides a simple means for controlling the speed of the rotor blades of the helicopter rotor contrary to helicopter rotors with the usual rigid transmission means for the lead-lag movement of the rotor blades. Besides the simplicity of construction, the invention permits the helicopter rotors to be equipped with a smaller number of rotor blades because the imbalance producing masses keep the vibrations in the rotor plane to a negligible amount.

A further feature of the invention is a construction in which the imbalance producing masses are arranged on a bearing support connected with the rotor head and secured against rotation relative to the aircraft's fixed axis system but which permits flapping-movements of the rotor about its mounting. The rotor head includes a double universal joint mounting for the rotor with resilient bearing means permitting a movement of the rotor out of its plane of rotation when subjected to disturbances. In one embodiment, the masses are arranged directly on the rotor head for rotation along with the rotor head, and in another embodiment, the masses are arranged on a separate member and rotated separately from the rotor head.

In accordance with another feature of the invention, the imbalance producing masses are made adjustable so that the sizes of the unbalancing means or weights may be adjusted in accordance with flight conditions. The size of the unbalancing masses can be varied continually during operation by an adjusting mechanism from zero to a maximum value.

According to a still further embodiment of the invention, the rotor blades are operatively connected through gear means with an element controlling the pivotal movement of the rotor blades. Such a device as is known, for example, from the German Patent No. 1,129,060 (United States Patent No. 3,139,937), has the function in the present invention of controlling the pivotal movement of the rotor blades effected by the imbalance producing masses and thus to prevent the appearance of disturbances with such pivotal movements. Since the above-mentioned device has only a controlling effect, it can be of very simple design and low weight.

The aforesaid embodiment permits a rigid mounting of the rotor on the helicopter, because no disturbance will become effective and thus no compensation of disturbances by off setting the rotor from its plane of rotation will be necessary.

Accordingly, it is an object of the invention to provide an improved helicopter rotor construction with means for producing controlled lead-lag pivotal movements of the blades during the rotation of the rotor.

A further object of the invention is to provide an imbalance producing means which is rotatable on a rotor head for causing unbalancing forces for changing the rotative speed of rotor blade elements of the rotor.

A further object of the invention is to provide a helicopter rotor in which at least the upper portion of the rotor is mounted on resilient means to permit it to be offset from the plane of rotation to accommodate any disturbance, and which further includes rotating weight elements which are connected to the rotor for rotation therewith in order to produce unbalancing forces for effecting the acceleration and deceleration of rotor blade-elements which are pivotally mounted on the rotor head for pivotal lead-lag movement as well as for rotative movement with the rotor.

A further object of the invention is to provide a rotor head construction having imbalance producing means rotatably mounted either directly on the rotor head or on a separate stationary part for separate rotation and which are effective to regulate the pivotal movement of the rotor blades about a lead-lag axis.

A further object of the invention is to provide means for regulating the lead-lag movement of a rotor having a plurality of rotor blade elements which are mounted on the rotor for pivotal lead-lag movement about an axis substantially vertical to the axis of the rotor, and with means for varying the size of the unbalancing means during the operation of the rotor.

A further object of the invention is to provide a helicopter rotor which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 13 is a view similar to FIG. 1 of another embodiment of the invention; and

FIG. 14 is a bottom view of the rotor head indicated in FIG. 13.

Figure 1:
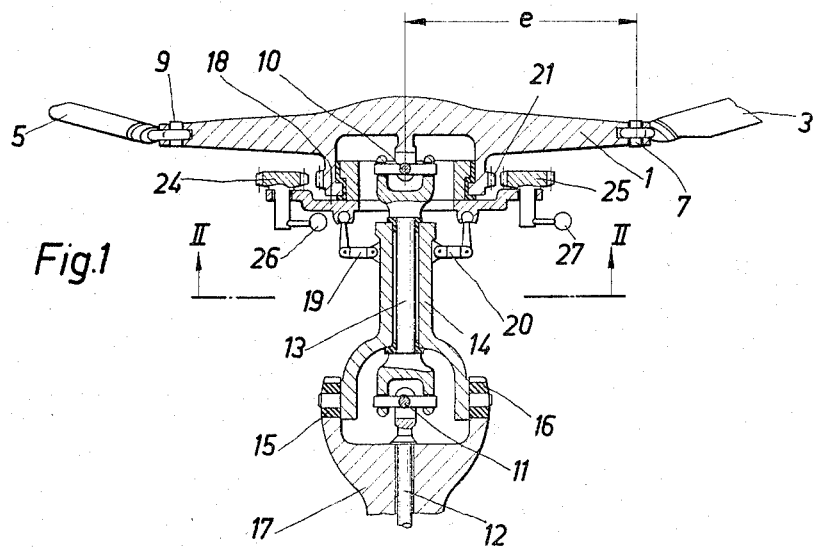
FIG. 1 is a longitudinal section through a rotor head of a helicopter with a drive according to the invention for the pivotal movement of the rotor blades.
Figure 2:
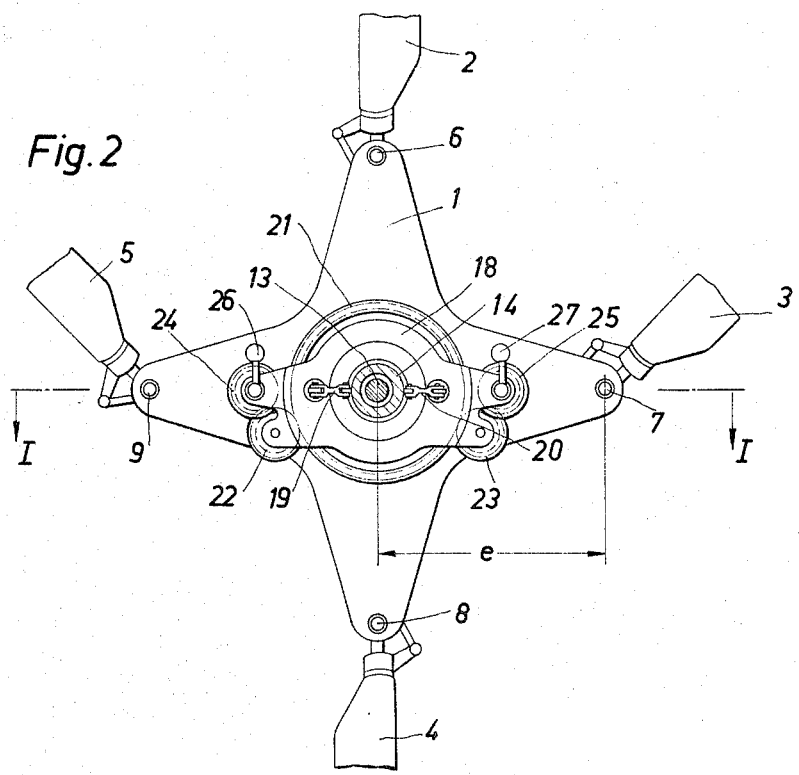
FIG. 2 is a partial bottom plan view of the rotor indicated in FIG. 1.

Referring to the drawings in particular, the invention embodied therein in FIGS. 1 and 2 comprises a semi-rigid rotor head 1 on which rotor blades 2, 3, 4 and 5 are pivotally mounted for pivotal lead-lag movement about pivots or pins 6, 7, 8 and 9, respectively. Thus, each blade 2–5 pivots about its lead-lag axis substantially perpendicular to the axis of the rotor in addition to its rotation along with the rotor when the helicopter is operated. Each of the axes of the pivots 6, 7, 8 and 9 is at a distance e from the center of the rotor axis which is at least approximately the same as the reducing pendulum length of the rotor blades 2, 3, 4 and 5, so that the rotor blades are always in resonance in respect to a single pivotal swing per revolution of the rotor.

The rotor head is mounted on a universal or cardan joint system including an upper cardan or universal joint 10 and a lower universal joint 11 which connects the rotor head to a rotor shaft 12. An intermediate rotor shaft 13 interconnects the universal joints 10 and 11 and it is supported on bearing bushes on each end of a bearing bushing member 14 which in turn is elastically mounted by elastic elements 15 and 16 carried on a gear case 17 which is affixed to part of the body of the helicopter. The mounting is such that the universal joints 10 and 11 and thus the rotor head may perform tilting or tumbling movements in respect to the axis of the shaft 12 or the plane of rotation of the rotor.

A bearing support 18 is mounted below a downward cylindrical extension of the rotor head 1 and is connected with the bearing bushing 14. The bearing support 18 follows all of the pivotal or tumbling movements of the rotor head 1 about a vertical axis but does not rotate about the rotor axis with the rotor. On the rotor head 1 is secured a gear rim 21 which has an external gear which meshes with intermediate gear wheels 22 and 23 arranged on diametrically opposite sides thereof, being rotatably carried on the bearing support 18. The intermediate gear wheels 22 and 23 are in turn engaged by planetary wheels 24 and 25 which are also rotatable on bearing support 18. The planetary wheels 24 and 25 are secured to the imbalance producing masses or weight elements 26 and 27. The support 18 is secured against rotation by connection through links 19 and 20 to the bearing bush 14.

Figure 11:
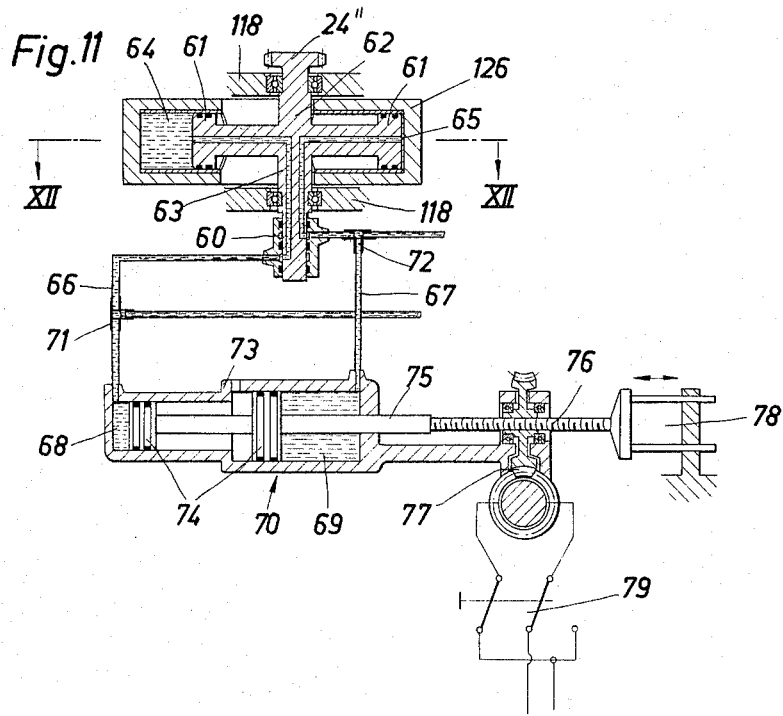
FIG. 11 is a somewhat schematic transverse sectional view of the apparatus for varying the size of the mass unbalancing means with the imbalance producing means represented in a position which corresponds to the maximum possible eccentricity.
Figure 12:
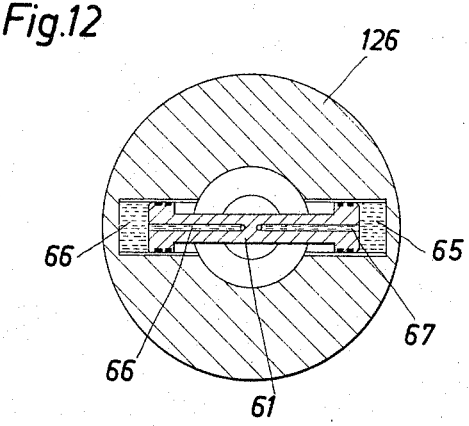
FIG. 12 is a top plan view of the apparatus indicated in FIG. 11, with the imbalance producing mass indicated in a central position.

The masses 26 and 27 are so adjusted that they both will always have the same rotary position and will hence turn synchronously. In FIG. 1 the masses 26 and 27 are shown turned out of position by 90° for clarity's sake. Their correct position is shown in FIG. 2. Corresponding to the indicated number of four rotor blades for the rotor assembly, the planetary wheels 24 and 25, and with them the imbalance producing masses 26 and 27, will rotate on the basis of a selected transmission ratio with the four fold speed of the rotor. Due to the intermediate gear wheels 23 and 22, the masses 26 and 27 will have the same direction of rotation as the rotor. The size of the mass imbalance can be adjusted during the operation, if necessary, by an adjusting mechanism of a type which is illustrated in FIGS. 11 and 12 and which is to be described more fully hereinafter.

Figure 3:
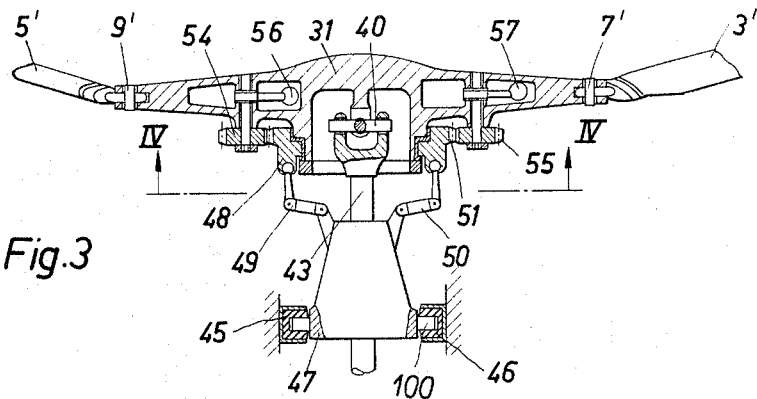
FIG. 3 is a view similar to FIG. 1 of another embodiment of the invention.
Figure 4:
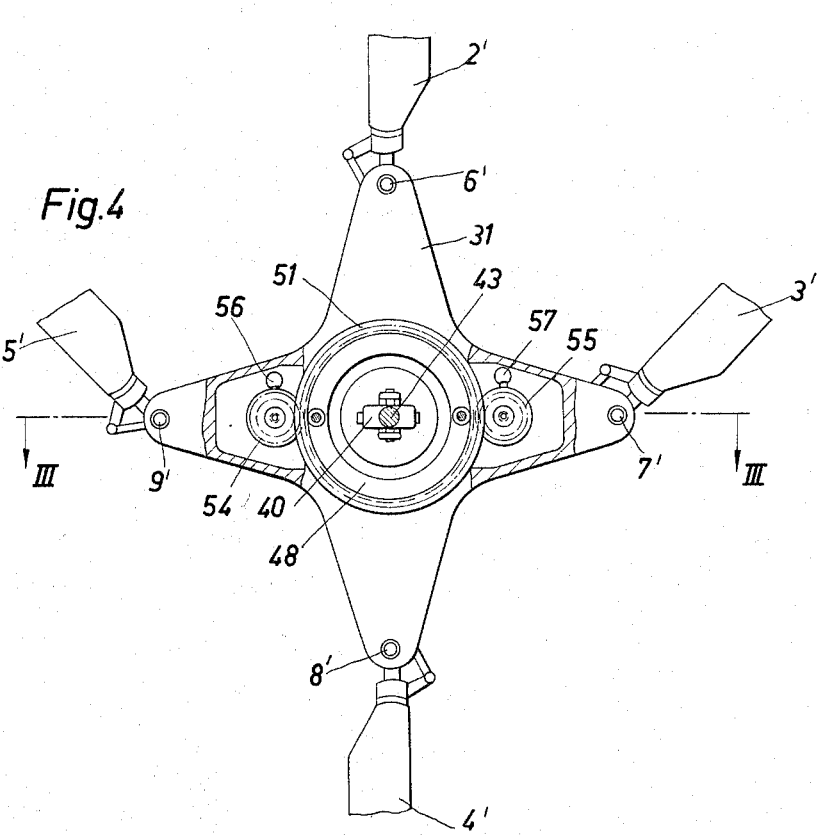
FIG. 4 is a view similar to FIG. 2 of the embodiment of the invention indicated in FIG. 3.
Figure 5:
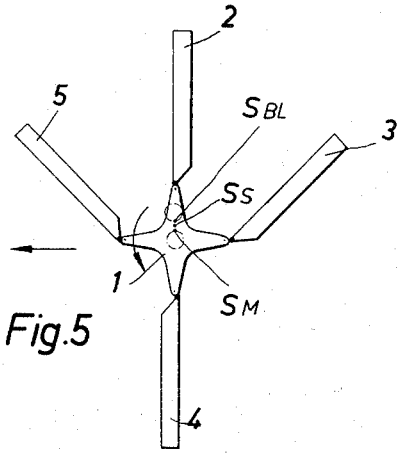
FIGS. 5 to 8 are schematic top plan view indications of the blades of a helicopter rotor in four different blade positions and the resultant movement of the center of gravity.
Figure 6:
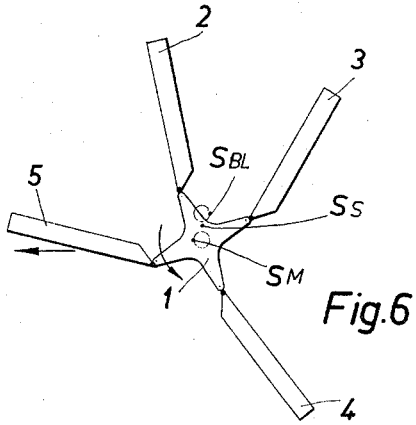
Figure 7:
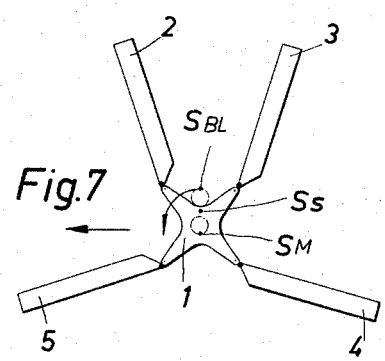
Figure 8:
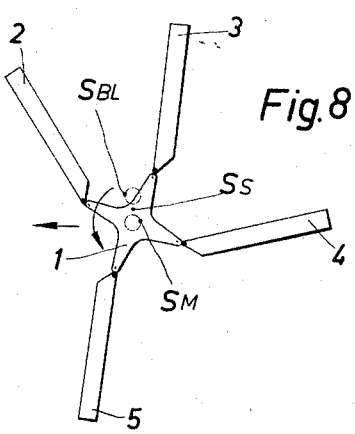

In FIGS. 3 and 4 there is indicated another embodiment of drive according to the invention for the pivotal movement of the rotor blades with the principal difference, as compared with FIGS. 1 and 2, that the imbalance producing means are supported directly on the rotor head. As indicated, on a semi-rigid rotor head 31, rotor blades 2', 3', 4' and 5' are mounted for piovtal lead-lag movement about pins or piovts 6', 7', 8' and 9', respectively. The rotor head 31 is connected through an universal or cardan joint 40 with a rotor shaft 32 which is supported in a gear case 47. The gear case 47 on which there is connected a self-supporting propulsion unit (not represented) is movably suspended in the body of the helicopter by means of elastic elements 45 and 46. For this purpose, the gear case 47 has projections 100 which engage with the resilient elements 45 and 46. The universal joint 40, and hence the rotor and rotor head 31, can thus perform movements in the rotation plane of the rotor.

On the rotor head 31 there is secured a bearing support 48 which is connected through links 49 and 50 with the gear case 47. The bearing support 48 is provided with a gear rim 51 which is in engagement with the gears 54 and 55 which are rotatably mounted directly on the rotor head 31 and which are connected with or formed as a part of imbalance masses 56 and 57, respectively. The imbalance producing masses 56 and 57 are so adjusted that both have the same rotary position, for example, as indicated in FIG. 1, and hence rotate in synchronism.

If the rotation plane of the rotor becomes inclined with regard to the rotor shafts 12 and 43 (FIGS. 1 and 3), respectively, the movement of the revolving rotor blade masses is also followed by the imbalance producing masses because the latter are arranged on the bearing support 18 and on the rotor head 31, respectively. For this reason there is no imbalance acting toward the outside, even when there are flapping movements of the rotor.

The total center of gravity of all the rotor blades performs a small, approximately circular, movement during their pivotal movement according to the relation xi equals A cos phi (where xi designates the angle of swing, A the amplitude of the pivotal movement and phi the rotary position of the rotor head). The cyclic frequency of this movement is a multiple of the rotor speed corresponding to the number of rotor blades, its direction of rotation and that of the rotor being identical. The diameter of the circular movement of the total center of gravity of the rotor blades increases both with increasing swing amplitude and with decreasing number of rotor blades. If there is superposed on this movement of the total center of gravity an equal but oppositely directed movement with the same direction of rotation as the rotor, of an imbalance producing mass or masses, the center of gravity of the total system with the imbalance producing masses will remain in rest. Inversely, the imbalance producing masses, as far as they are positively driven with a speed which corresponds to a single pivotal movement of each rotor blade per each revolution of the rotor, hence to the rotor blade multiple of the rotor speed, enforce a pivotal movement of connected freely movable rotor blades. This is because all movements of the various parts of the system under consideration must be so effected that the center of gravity of the above system remains in rest and because the forces under consideration are only internal and not external forces. The distance of the pivots from the rotor axis is about the same as the reduced pendulum length of the rotor blades, so that the rotor blades are in resonance with regard to a single pivotal swing per revolution of the rotor and the pivotal movement of the rotor blade takes place according to the above indicated relation.

The method of operation of the pivot drive of the invention can be explained by considering the movements of the total center of gravity of the rotor blades in reference to FIGS. 5–8. In these figures, there is indicated a schematic representation of a four blade rotor in four different rotary positions with the resultant movements of the centers of gravity in a trouble-free pivotal movement. The straight arrow represents the direction of directional flight of the helicopter and the curved arrow indicates the direction of rotation of the rotor.

By referring to FIGS. 5–8, it can be seen that the total center of gravity S–B1 of the rotor blades 2, 3, 4 and 5 moves on the circle indicated in dotted lines. The center of gravity S–M of the imbalance producing masses which are not represented in FIGS. 5–8 for clarity purposes, moves on the second circle indicated in dotted lines. The position of these centers of gravity S–M with the various rotary positions of the rotor can likewise be seen in the drawings. The addition of the centers of gravity S–B1 and S–M yields the center of gravity of the system S–s. This system remains stationary in the present particular aircraft, as can be seen clearly from the drawing figures.

Figure 9:
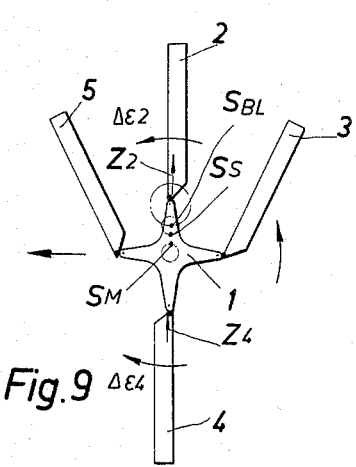
FIGS. 9 and 10 are schematic top plan views of a rotor of a helicopter similar to FIGS. 5 to 18, but indicating the effect of the pivot drive of the invention in eliminating the disturbances in the pivotal lead-lag movement of the blades.

In FIG. 9 there are indicated pivotal movements of the rotor blades 2, 3, 4 and 5 which are greater than that produced by the imbalance producing masses because of a disturbance. Consequently, the total center of gravity S–B1 of the rotor blades 2, 3, 4 and 5 describes a larger circle displaced toward the rotor blade 2 than the center of gravity S–M of the imbalance producing masses whose gravity circle has remained unchanged in size and position with regard to the rotor head 1.

The addition of the centers of gravity S–B1 and S–M yields the center of gravity S–s of the system under consideration which is now no longer stationary with regard to the aircraft but moves on a circle in the same direction of rotation as the rotor. The rotor thus performs a sort of tilting or tumbling movement which it can perform because of its elastic support. Due to this tilting or tumbling movement, the forward rotor blades receive an additional centrifugal force Z2 when in the rotary position of the rotor blade 2 represented in FIG. 9, and the reserve rotor blades (the rotor blade 4) receives a reduction of the centrifugal force by the value Z4. The additional centrifugal force of the forward blades results in the latter with a phase displacement of 90° in an acceleration of their pivotal movement by the value $\Delta\epsilon_2$, while the reduction of the centrifugal forces of the reserve blades delays the pivotal movement of these rotor blades by the value $\Delta\epsilon_4$ and also with a phase displacement of 90°. This results in a reduction of the swing amplitude which each forward and trailing rotor blade undergoes until the swing amplitude corresponds to the anticipated size of the imbalance produced by the imbalance producing masses which can be recognized from a wobble free movement of the rotor. In the same manner, a disturbance on a single rotor blade is balanced automatically. The straight arrow indicated in FIGS. 9 and 10 indicates the direction of flight of the helicopter and the curved arrow the direction of rotation of the rotor.

Figure 10:
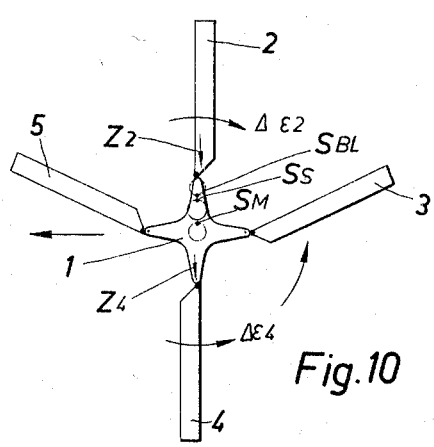

In FIG. 10 the other situation is indicated where the pivotal movement of the rotor blades 2–5 has become smaller than that produced by the imbalance producing masses because of a disturbance. Consequently, the total center of gravity S–B1 of the rotor blades 2–5 describes a smaller circle displaced toward the rotor center than the center of gravity S–M of the imbalance producing masses, whose gravity circle has again remained unchanged in size and position with regard to the rotor head 1. The addition of the centers of gravity S–B1 and S–M yields the center of gravity S–s of the system under consideration which is also not stationary with regard to the aircraft but moves on a circle in the same direction of rotation as the rotor. The rotor thus performs a tumbling movement made possible by its elastic support. Due to this tumbling movement, the forward rotor blades when in the rotary position as represented in FIG. 10 by the rotor blade 2 undergo a reduction of their centrifugal force by the value Z2 and the reserve rotor blades (here the rotor blade 4) receive an additional centrifugal force Z4. The reduction of the centrifugal force delays, with a phase displacement of 90°, the pivotal movement of the forward rotor blades by the value $\Delta\epsilon_2$, while the additional centrifugal forces which act on the reserve rotor blades accelerate their pivotal movement by $\Delta\epsilon_4$ also with a phase displacement of 90°. The result is an increase of the swing amplitude which each rotor blade undergoes until the swing amplitude corresponds to the anticipated size of the imbalance produced by the unbalanced masses. In the same manner, the disturbances on individual rotor blades or on one rotor blade are automatically compensated.

In FIGS. 11 and 12 there is indicated an adjustment mechanism for the continuous variation of the size of the mass imbalance. A mass 126 is indicated in the position of maximum eccentricity in FIG. 11, while the same mass 126 is indicated in a central position in FIG. 12. The imbalance producing mass 126 is designed as a circular disc and has two aligned bores extending radially to the outside in which a double piston 61 is displaceably mounted for displacement in directions along its longitudinal axis. In this manner, a double action cylinder piston system is obtained. The double piston 61 is journalled on a bearing support 118 through right angle extensions or journals 62 and 63. The upper end of the journal 64 carries a rotatably planetary wheel 24" which is driven, directly or indirectly, as indicated in the other embodiment.

In this manner, the double piston 61 which is associated and slidable with the imbalance producing mass 126, effects the necessary displacement of the imbalance weight. The mass 126 itself defines working chambers 64 and 65 at each end of the double acting piston 61. The working chambers 64 and 65 are connected through hydraulic lines 66 and 67, respectively, which extend through the piston 61 and into the journal 63 for communication through a stationary sleeve 60 with a pumping chamber 68 and 69, respectively, of a pump 70. The two hydraulic lines 66 and 67 each have a branch 71 and 72 for the hydraulic connection of the working chambers of a second unbalance mass (not represented) with the pump 70. The pump 70 consists of a cylinder 73 with an offset diameter portion and with a correspondingly designed double-acting piston 74. The change in diameter within the cylinder 73 is necessary because the cross-section of the piston rod 75 must be taken into account to obtain a pump piston surface which is equal on both sides. The pump 70 is driven by a motor (not represented) whose direction of rotation is reversible or which may drive through a reversing gear to a spindle drive 76 and a worm drive 77. A guide 78 prevents the turning of the piston rod 75 so that the motor drive results in a pure axial movement of the pump piston 74. In this manner, the eccentricity of the unbalance mass 126, and thus the size of the mass unbalance can be adjusted during the operation in accordance with the necessary flight operational requirements by means of an electrical switch or transmitter 79 which is connected to the motor for operating the worm drive 77.

In FIGS. 13 and 14 a motor head, which differs from that described in FIGS 1 and 2 only in respect to the bearing support construction and arrangement of imbalance producing masses, is indicated. In this embodiment, the mass imbalance elements are also provided with the adjustment described with respect to FIGS. 11 and 12. The parts have already been described heretofore, and similar parts are similarly designed but with primes (″) added.

On a bearing support 118 are secured tthe imbalance producing masses 126 and 127 having journal portions 62 and 63 as indicated in the embodiments of FIGS. 11 and 12. Only portions of the connecting hydraulic lines are indicated and the pump of FIGS. 11 and 12 is not indicated. The pump may be adjusted automatically by electrical means for varying the eccentricity of the masses 126 and 127 for the purposes of controlling the rotation of the blades about their pivotal lead-lag axes. All of the devices and apparatus may be arranged beneath the rotor 1″ in a very compact manner due to the design according to the invention, and they are preferably covered with a streamlined tank 80 of low flow resistance, as indicated in FIG. 14.

While specific embodiments of the invention have been shown and described in detail to illustrate the application of the inventive principles, it will be understood that the invention may be embodied otherwise without departing from such principles.

What is claimed is:

1. A helicopter rotor construction comprising a rotor rotatable about an axis which is substantially vertical, a plurality of rotor blades pivotally mounted on said rotor at a spaced location from the axis of rotation thereof and each being pivotal for movement in lead-lag directions about an axis substantially parallel to the axis of rotation of said rotor during the rotation of said rotor, and mass imbalance producing means operatively associated with said rotor by a transmission means, the transmission ratio of which effects a mass rotational speed of a multiple of the rotor speed in the direction of rotation of the rotor, said multiple corresponds to the number of rotor blades, for influencing the pivotal lead-lag movement of said rotor blades during rotation of said rotor.

2. A helicopter rotor construction comprising a rotor rotatable about an axis which is substantially vertical, a plurality of rotor blades pivotally mounted on said rotor at a spaced location from the axis of rotation thereof and each being pivotal for movement in lead-lag directions about an axis substantially parallel to the axis of rotation of said rotor during the rotation of said rotor, and mass imbalance producing means operatively associated with said rotor by a transmission means, the transmisison ratio of which effects a mass rotational speed of a multiple of the rotor speed in the direction of rotation of the rotor, said multiple corresponds to the number of rotor blades, for influencing the pivotal lead-lag movement of said rotor blades during rotation of said rotor, said mass imbalance producing means comprising a rotatable member and means rotatably supporting said member.

3. A helicopter rotor construction comprising a rotor rotatable about an axis which is substantially vertical, a plurality of rotor blades pivotally mounted on said rotor at a spaced location from the axis of rotation thereof and being pivotal for movement in lead-lag directions about an axis substantially parallel to the axis of rotation of said rotor during the rotation of said rotor, and mass imbalance producing means operatively associated with said rotor by a transmission means, the transmission ratio of which effects a mass rotational speed of a multiple of the rotor speed in the direction of rotation of the rotor, said multiple corresponds to the number of rotor blades, for influencing the pivotal lead-lag movement of said rotor blades during rotation of said rotor, said mass imbalance producing means comprising a stationary support adjacent said rotor and a member rotatable on said stationary support and driven by said rotor.

4. A helicopter rotor construction comprising a rotor rotatable about an axis which is substantially vertical, a plurality of rotor blades pivotally mounted on said rotor at a spaced location from the axis of rotation thereof and being pivotal for movement in lead-lag directions about an axis substantially parallel to the axis of rotation of said rotor during the rotation of said rotor, and mass imbalance producing means operatively associated with said rotor by a transmission means, the transmission ratio of which effects a mass rotational speed of a multiple of the rotor speed in the direction of rotation of the rotor, said multiple corresponds to the number of rotor blades, for influencing the pivotal lead-lag movement of said rotor blades during rotation of said rotor, said mass imbalance producing means comprising a member rotatably mounted on said rotor.

5. A helicopter rotor construction comprising a rotor rotatable about an axis which is substantially vertical, a plurality of rotor blades pivotally mounted on said rotor at a spaced location from the axis of rotation thereof and being pivotal for movement in lead-lag directions about an axis substantially parallel to the axis of rotation of said rotor during the rotation of said rotor, and mass imbalance producing means operatively associated with said rotor and being rotatable therewith for influencing the pivotal lead-lag movement of said rotor blades during rotation of said rotor, said mass imbalance producing means comprising a rotatable weight member, a gear connected to said weight member for rotation therewith, and gear means connected to said rotor and to said gear for rotating said weight means, the ratio of said gear means being so dimensioned as to effect a mass rotational speed of a multiple of the rotor speed in the direction of rotation of the rotor, said multiple corresponds to the number of rotor blades.

6. A helicoper rotor construction comprising a rotor rotatable about an axis which is substantially vertical, a plurality of rotor blades pivotally mounted on said rotor at a spaced location from the axis of rotation thereof and being pivotal for movement in lead-lag directions about an axis substantially parallel to the axis of rotation of said rotor during the rotation of said rotor, and mass imbalance producing means operatively associated with said rotor and being rotatable therewith for influencing the pivotal lead-lag movement of said rotor blades during rotation of said rotor, said mass imbalance producing means comprising a rotatable weight member, a stationary supporting member, said weight member being rotatable on said stationary supporting member, a gear connected to said weight member for rotation therewith, and gear means connected to said rotor and to said gear for rotating said weight means, the ratio of said gear means being so dimensioned as to effect a mass rotational speed of a multiple of the rotor speed in the direction of rotation of the rotor, said multiple corresponds to the number of rotor blades.

7. A helicopter rotor construction comprising a rotor rotatable about an axis which is substantially vertical, a plurality of rotor blades pivotally mounted on said rotor at a spaced location from the axis of rotation thereof and being pivotal for movement in lead-lag directions about an axis substantially parallel to the axis of rotation of said rotor during the rotation of said rotor, and mass imbalance producing means operatively associated with said rotor and being rotatable therewith for influencing the pivotal lead-lag movement of said rotor blades during rotation of said rotor, said mass imbalance producing means comprising a rotatable weight member, a gear connected to said weight member for rotation therewith, said weight member being rotatably mounted on said rotor, and a stationary gear member surrounding said rotor in driving engagement with said gear for rotating said weight member when said rotor is rotated, the ratio of said gear means being so dimensioned as to effect a mass rotational speed of a multiple of the rotor speed in the direction of rotation of the rotor, said multiple corresponds to the number of rotor blades.

8. A helicopter rotor construction comprising a rotor rotatable about an axis which is substantially vertical, a plurality of rotor blades pivotally mounted on said rotor at a spaced location from the axis of rotation thereof and being pivotal for movement in lead-lag directions about an axis substantially parallel to the axis of rotation of said rotor during the rotation of said rotor, and mass imbalance producing means operatively associated with said rotor and being rotatable therewith for influencing the pivotal lead-lag movement of said rotor blades during rotation of said rotor, said mass imbalance producing means comprising a rotatable weight member, a gear connected to said weight member for rotation therewith, said rotor having an annular gear portion, said gear being in meshing engagement with said gear portion and being rotatable upon rotation of said rotor, the ratio of said gear means being so dimensioned as to effect a mass rotational speed of a multiple of the rotor speed in the direction of rotation of the rotor, said multiple corresponds to the number of rotor blades.

9. A helicopter rotor construction comprising a rotor rotatable about an axis which is substantially vertical, a plurality of rotor blades pivotally mounted on said rotor at a spaced location from the axis of rotation thereof and each being pivotal for movement in lead-lag directions about an axis substantially parallel to the axis of rotation of said rotor during the rotation of said rotor, and mass imbalance producing means operatively associated with said rotor by a transmission means, the transmission ratio of which effects a mass rotational speed of a multiple of the rotor speed in the direction of rotation of the rotor, said multiple corresponds to the number of rotor blades, for influencing the pivotal lead-lag movement of said rotor blades during rotation of said rotor, said mass imbalance producing means comprising a rotatable member and means for shifting said member in respect to its center of rotation during operation of said rotor.

10. A helicopter rotor construction comprising a rotor rotatable about an axis which is substantially vertical, a plurality of rotor blades pivotally mounted on said rotor at a spaced location from the axis of rotation thereof and each being pivotal for movement in lead-lag directions about an axis substantially parallel to the axis of rotation of said rotor during the rotation of said rotor, and mass imbalance, producing means operatively associated with said rotor by a transmission means, the transmission ratio of which effects a mass rotational speed of a multiple of the rotor speed in the direction of rotation of the rotor, said multiple corresponds to the number of rotor blades, for influencing the pivotal lead-lag movement of said rotor blades during rotation of said rotor, said mass imbalance producing means comprising a rotatable member, means mounting said member permitting shifting of said member in respect to its center of rotation during operation of said rotor, a fluid motor connected to said member mounting means for shifting said member on said mounting means, and electrical control means for operating said fluid motor for shifting said member in respect to its center of rotation.

11. A helicopter rotor construction comprising a rotor rotatable about an axis which is substantially vertical, a plurality of rotor blades pivotally mounted on said rotor at a spaced location from the axis of rotation thereof and each being pivotal for movement in lead-lag directions about an axis substantially parallel to the axis of rotation of said rotor during the rotation of said rotor, and mass imbalance producing means operatively associated with said rotor by a transmission means, the transmission ratio of which effects a mass rotational speed of a multiple of the rotor speed in the direction of rotation of the rotor, said multiple corresponds to the number of rotor blades, for influencing the pivotal lead-lag movement of said rotor blades during rotation of said rotor, said mass imbalance producing means comprising a rotatable disc member having a hollow bore, a rotatable combination piston and bearing member, said piston and bearing member including piston portions extending laterally outwardly from each side and being slidable in the bore of said disc member, said disc member being rotatable with said combination piston and bearing member, and means for selectively directing fluid into said disc member into the space between respective ones of said piston portions and the respective ends of the bore of said disc member for shifting said disc member to vary the location of the center of rotation of said disc member.

12. A helicopter rotor construction comprising a rotor rotatable about an axis which is substantially vertical, a plurality of rotor blades pivotally mounted on said rotor at a spaced location from the axis of rotation thereof and each being pivotal for movement in lead-lag directions about an axis substantially parallel to the axis of rotation of said rotor during the rotation of said rotor, and mass imbalance producing means operatively associated with said rotor by a transmission means, the transmission ratio of which effects a mass rotational speed of a multiple of the rotor speed in the direction of rotation of the rotor, said multiple corresponds to the number of rotor blades, for influencing the pivotal lead-lag movement of said rotor blades during rotation of said rotor, said mass imbalance producing means comprising a rotatable combination piston and bearing member having at least one piston portion extending laterally outwardly and having a shank portion extending substantially vertically, means rotatably mounting said combination piston and bearing member at the location of said shank portion, a disc member carried on said combination piston and bearing member and having a bore in which said piston portion is slidable, and means for directing a fluid into the space between said piston portion and the end of the bore of said disc bore for shifting said disc member about said shank portion for varying the center of rotation thereof.

13. A device for producing a rotational imbalance force for an apparatus such as a helicopter rotor comprising a rotatable combination piston and bearing support member including a piston portion extending laterally and a shank portion extending substantially vertically, means rotatably supporting said combination piston and bearing support member at the location of the shank portion, a disc member positioned around the shank portion of said combination piston and bearing member and having a bore in which the piston portion is slidable, and means for directing a fluid under pressure between said piston portion and the end wall of the bore of said disc member in relation to said shank portion for varying the position of the center of rotation thereof.

14. A device for producing a rotational imbalance force for an apparatus such as a helicopter rotor comprising a rotatable combination piston and bearing support member including a piston portion extending laterally and a shank portion extending substantially vertically, means rotatably supporting said combination piston and bearing support member at the location of the shank portion, a disc member positioned around the shank portion of said combination piston and bearing member and having a bore in which the piston portion is slidable, and means for directing a fluid under pressure between said piston and the end wall of the bore of said disc member for shifting the center of said disc member in relation to said shank portion for varying the position of the center of rotation thereof, said combination piston and bearing member being hollowed for the flow of fluid therethrough from said shank portion through said piston portion to the interior bore of said disc member.

15. A device for producing a rotational imbalance force for an apparatus such as a helicopter rotor comprising a rotatable combination piston and bearing support member including a piston portion extending laterally and a shank portion extending substantially vertically, means rotatably supporting said combination piston and bearing support member at the location of the shank portion, a disc member positioned around the shank portion of said combination piston and bearing member and having a bore in which the piston portion is slidable, and means for directing a fluid under pressure between said piston portion and the end wall of the bore of said disc member for shifting the center of said disc member in relation to said shank portion for varying the position of the center of rotation thereof, said combination piston and bearing member being hollowed for the flow of fluid therethrough from said shank portion through said piston portion to the interior bore of said disc member, and a fluid pump connected to the bore of the shank portion of said combination piston and bearing support member for delivering a fluid under pressure into the bore of said member for shifting said disc member.

16. A device for producing a rotational imbalance force for an apparatus such as a helicopter rotor comprising a rotatable combination piston and bearing support member including a rotatable shank portion and first and second piston portions extending laterally outwardly from respectively opposite sides of said shank portion, means rotatably supporting said combination piston and bearing support member at the location of the shank portion, a disc member positioned around the shank portion of said combination piston and bearing member and having a bore in which said first and second piston portions are slidable, said combination piston and bearing member being hollowed for the flow of fluid therethrough from said shank portion through respective ones of said first and second piston portions to the interior bore of said disc member, and means for selectively supplying fluid under pressure to the space between respective ones of said piston portions and the respective ends of the bore of said disc member for shifting said disc member in relation to said shank portion.

17. A helicopter rotor construction comprising a rotor rotatable about an axis which is substantially vertical, a plurality of rotor blades pivotally mounted on said rotor at a spaced location from the axis of rotation thereof and each being pivotal for movement in lead-lag directions about an axis substantially parallel to the axis of rotation of said rotor during the rotation of said rotor, mass imbalance producing means operatively associated with said rotor by a transmission means, the transmission ratio of which effects a mass rotational speed of a multiple of the rotor speed in the direction of rotation of the rotor, said multiple corresponds to the number of rotor blades, for influencing the pivotal lead-lag movement of said rotor blades during rotation of said rotor, a rotor shaft, and universal joint means connected between said rotor shaft and said rotor.

18. A helicopter rotor construction comprising a rotor rotatable about an axis which is substantially vertical, a plurality of rotor blades pivotally mounted on said rotor at a spaced location from the axis of rotation thereof and each being pivotal for movement in lead-lag directions about an axis substantially parallel to the axis of rotation of said rotor during the rotation of said rotor, and mass imbalance producing means operatively associated with said rotor by a transmission means, the transmission ratio of which effects a mass rotational speed of a multiple of the rotor speed in the direction of rotation of the rotor, said multiple corresponds to the number of rotor blades, for influencing the pivotal lead-lag movement of said rotor blades during rotation of said rotor, a rotor shaft, and universal joint means connected between said rotor shaft and said rotor, said universal joint means including means elastically supporting said rotor permitting tipping of the rotor about the plane of rotation thereof upon being subjected to disturbances.

19. A helicopter rotor construction comprising a rotor rotatable about an axis which is substantially vertical, a plurality of rotor blades pivotally mounted on said rotor at a spaced location from the axis of rotation thereof and being pivotal for movement in lead-lag directions about an axis substantially parallel to the axis of rotation of said rotor during the rotation of said rotor, and mass imbalance producing means operatively associated with said rotor by a transmission means, the transmission ratio of which effects a mass rotational speed of a multiple of the rotor speed in the direction of rotation of the rotor, said multiple corresponds to the number of rotor blades, for influencing the pivotal lead-lag movement of said rotor blades during rotation of said rotor, said mass imbalance producing means comprising a stationary support adjacent said rotor and a transmission member rotatable on said stationary support and driven by said rotor, said stationary support including a cylindrical portion resiliently supporting said rotor but being non-rotatable in respect thereto, and means resiliently supporting said supporting member around said rotor shaft.

References Cited by the Examiner

UNITED STATES PATENTS

| | | |
|---|---|---|
| 2,127,888 | 8/1938 | Sarazin. |
| 3,139,937 | 7/1964 | Derschmidt et al. __ 170—160.25 |

FOREIGN PATENTS

| | | |
|---|---|---|
| 748,909 | 4/1933 | France. |
| 798,294 | 3/1936 | France. |
| 1,015,318 | 9/1957 | Germany. |

MARTIN P. SCHWADRON, *Primary Examiner.*

E. A. POWELL, JR., *Assistant Examiner.*